F. H. HALSTEAD.
GRINDER.
APPLICATION FILED MAR. 12, 1918.

1,299,715.

Patented Apr. 8, 1919.
6 SHEETS—SHEET 2.

Inventor:
Frederick H. Halstead.
by Emery Booth Janney & Varney
Attys.

F. H. HALSTEAD.
GRINDER.
APPLICATION FILED MAR. 12, 1918.

1,299,715.

Patented Apr. 8, 1919.
6 SHEETS—SHEET 4.

Inventor:
Frederick H. Halstead
by Emery Booth Janney & Varney
Attys.

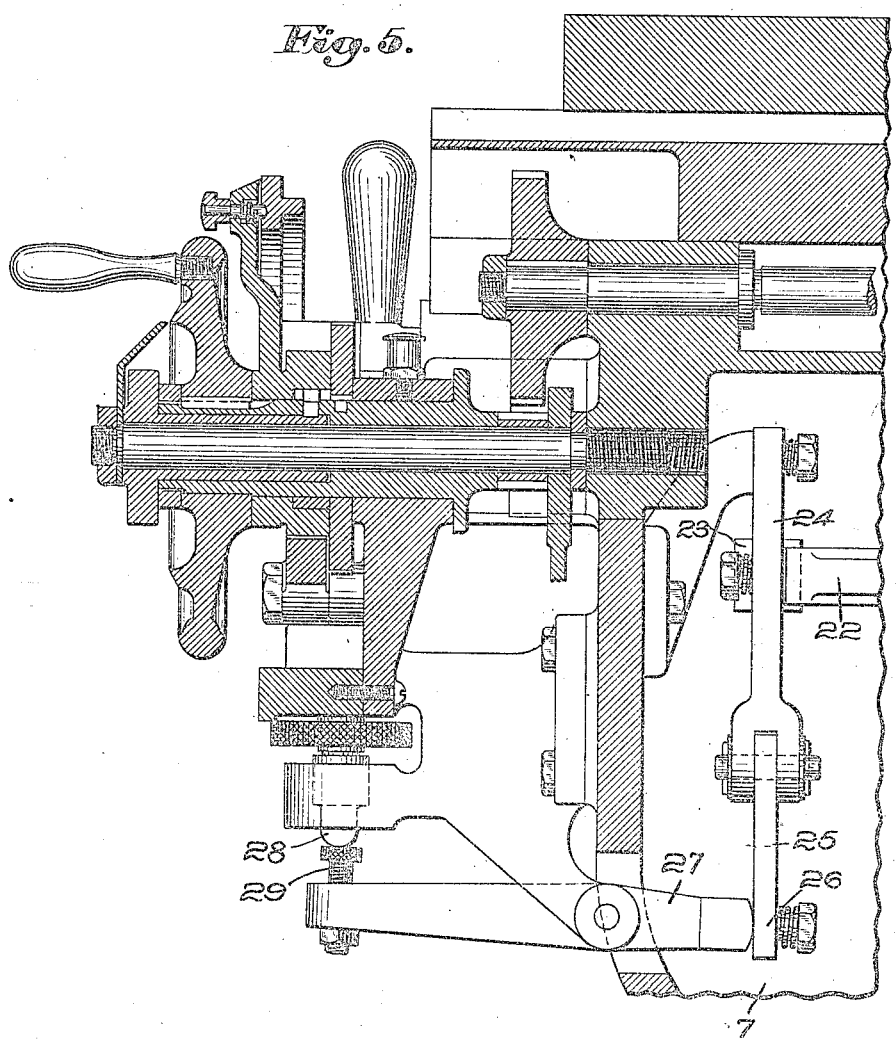

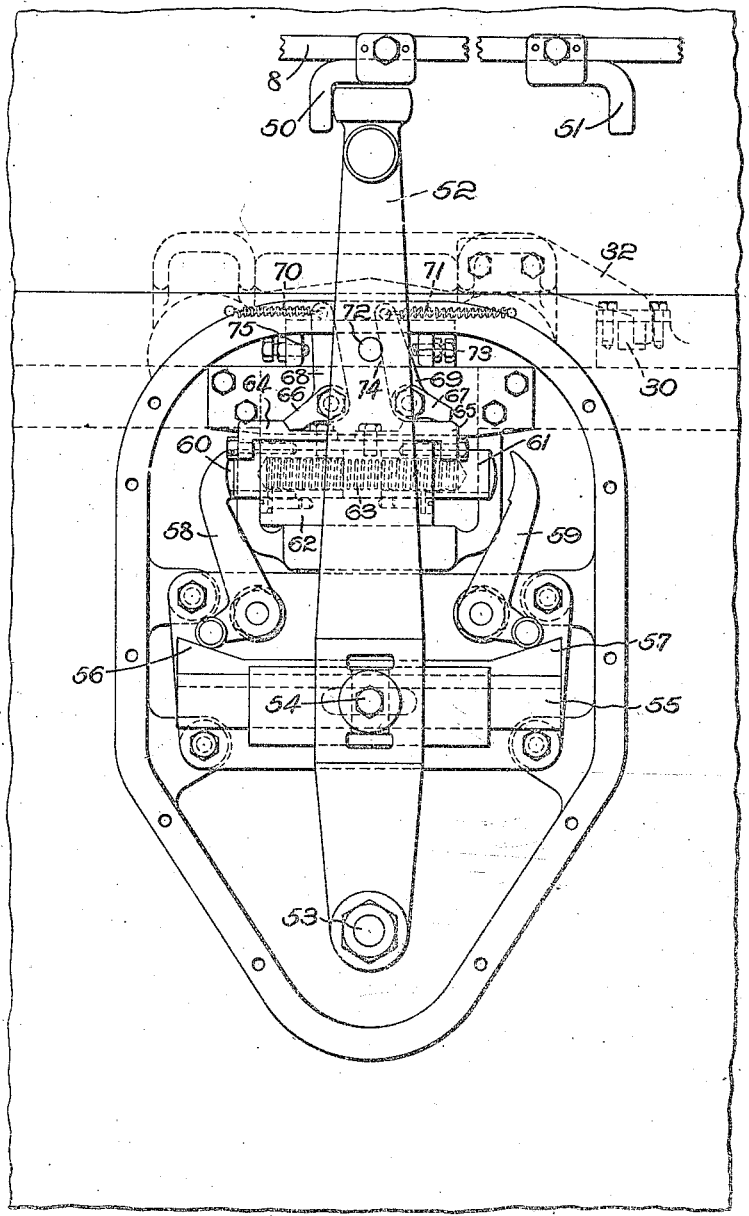

UNITED STATES PATENT OFFICE.

FREDERICK H. HALSTEAD, OF BOSTON, MASSACHUSETTS, ASSIGNOR TO RIVETT LATHE AND GRINDER COMPANY, OF FANEUIL, MASSACHUSETTS, A CORPORATION OF MASSACHUSETTS.

GRINDER.

1,299,715.  Specification of Letters Patent.  Patented Apr. 8, 1919.

Application filed March 12, 1918. Serial No. 221,954.

*To all whom it may concern:*

Be it known that I, FREDERICK H. HALSTEAD, a citizen of the United States, and a resident of Boston, county of Suffolk, and State of Massachusetts, have invented an Improvement in Grinders, of which the following description, in connection with the accompanying drawings, is a specification, like characters on the drawings representing like parts.

This invention pertains to improvements in grinders, and more particularly, though not exclusively, to improvements in machines and mechanisms adapted for grinding surfaces curved in two dimensions, such as the internal and external races of ball bearings, the races of thrust ball bearings, and spherical surfaces such as the balls and sockets of ball and socket joints. The illustrative machine selected as a preferred embodiment of my invention is in many respects similar to the machine shown in my co-pending application Serial No. 130,062, filed November 7, 1916.

Referring to the drawings:—

Fig. 5 is a section on the line 5—5 of Fig. 4; and

Fig. 6 is an elevation, partly broken away, taken from the left of Fig. 1 and showing details of a preferred form of reverse mechanism.

Figure 1:
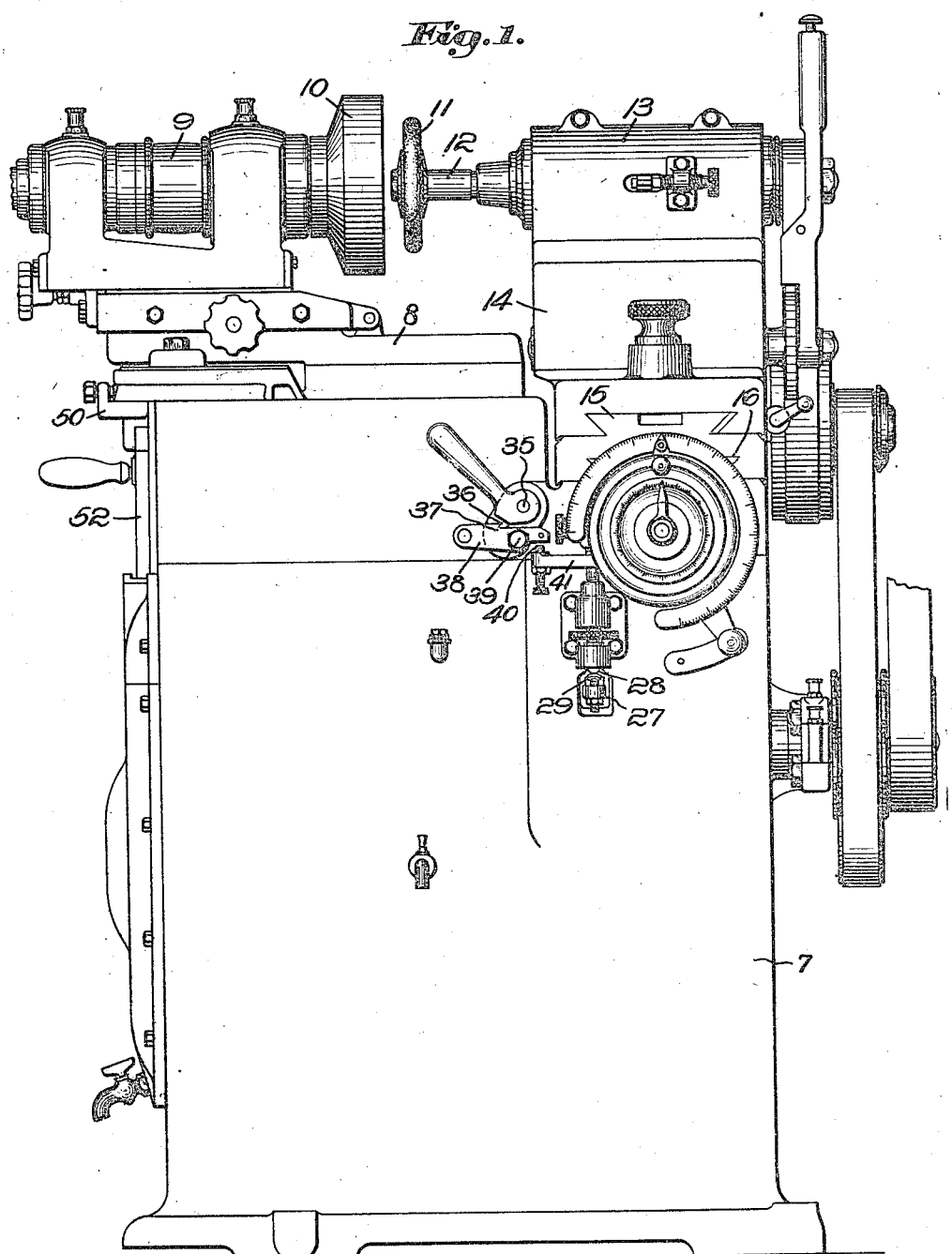
Figure 1 shows a side elevation of a preferred embodiment constituting one illustrative form of my invention.

Referring to Fig. 1, in the illustrative embodiment of my invention I have shown an oscillating grinder comprising a base 7 having mounted thereon an oscillatory support 8 for a work spindle 9 carrying any suitable chuck 10 and adapted to coöperate with the grinding wheel 11 mounted on the grinding wheel shaft 12 rotatable in the bearing 13. The tool support 14 is preferably, as shown, carried by a slide 15, similar to that shown and described in my co-pending application above mentioned, the slide 15 being in turn carried on a feed slide 16 and adapted to be fed relative thereto by feed mechanism which may resemble that shown in my co-pending application above mentioned.

Figure 2:
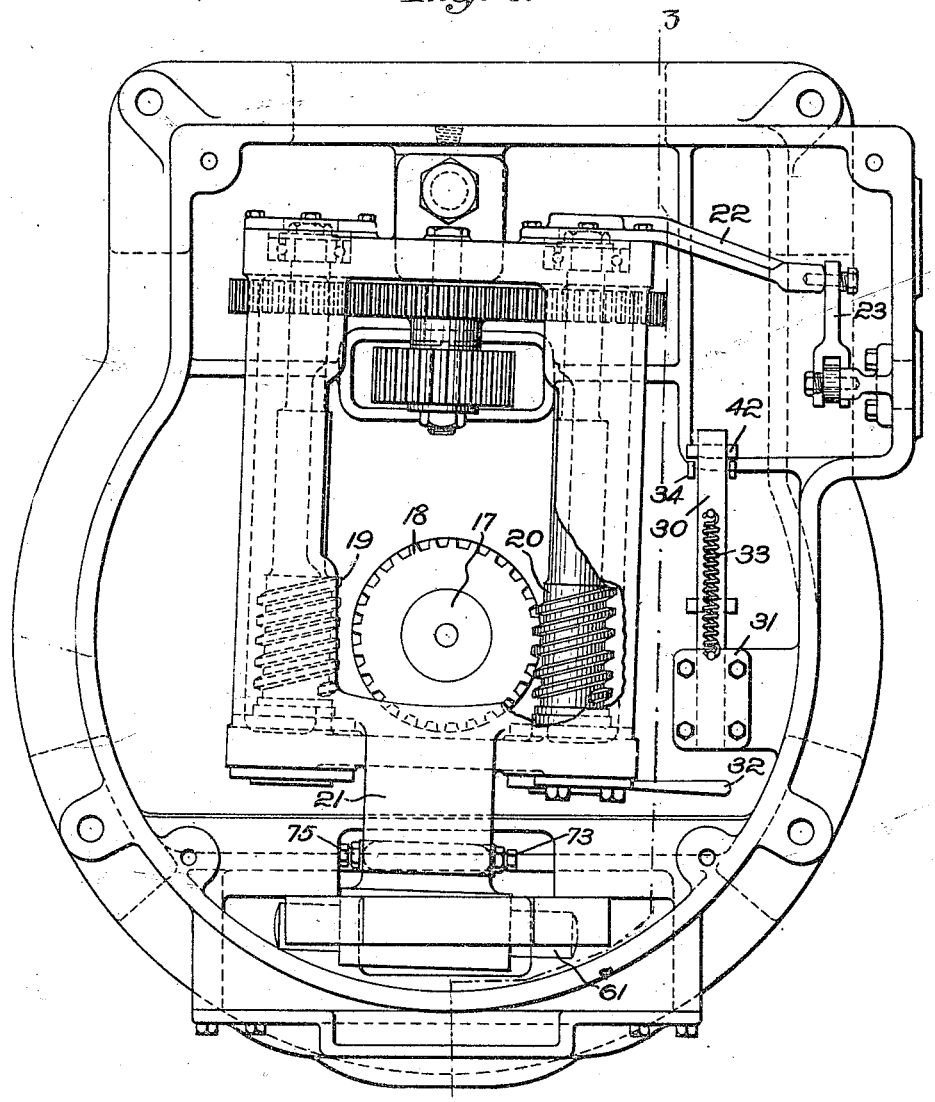
Fig. 2 is a plan view of the lower portions of the machine with the top thereof removed.
Figure 3:
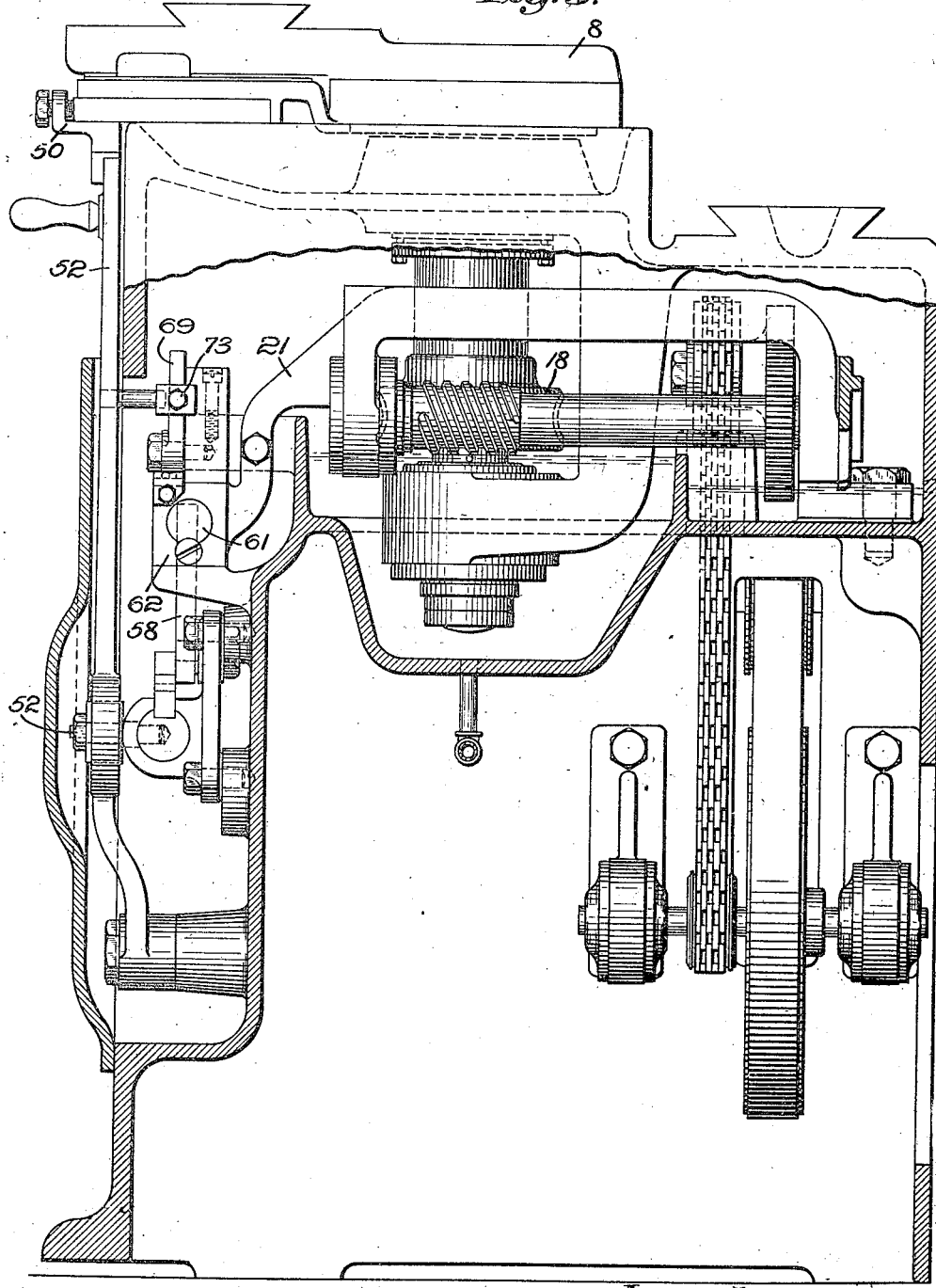
Fig. 3 is a vertical longitudinal section on the line 3—3 of Fig. 2.
Figure 4:
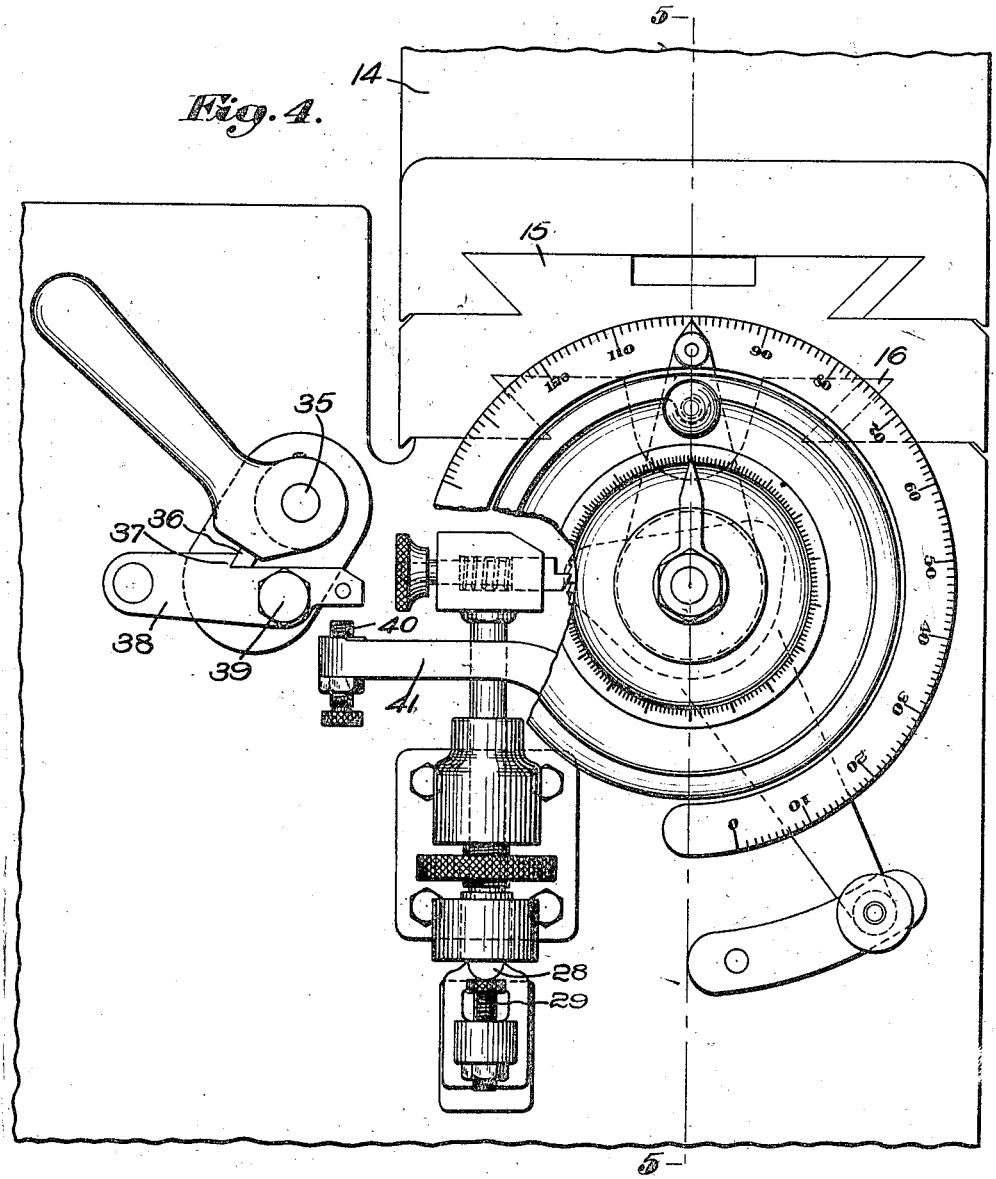
Fig. 4 is a side elevation on an enlarged scale, showing the detail of a portion of the feed mechanism shown in Fig. 1.

Referring now to Fig. 2, the oscillatory post 17, which carries the oscillatory support shown in Fig. 1, preferably carries a worm gear 18 adapted to be alternately engaged on alternate sides by driving worms 19, 20 turning in the same direction but adapted to engage the worm gear 18 on opposite sides thereof and hence to impart oscillatory movement thereto in opposite directions. The worms 19, 20 are preferably carried in an oscillatory worm cage 21 adapted to be shifted to and fro by reverse mechanism hereinafter more fully described. The worm cage 21 shifts only at the periods of reversal of the machine, and for this reason I prefer to utilize the movement of this cage to actuate feeding movement of the feed slide 15 and parts carried thereby. To this end I have provided an arm 22 connected at its outer end by a link 23, to a toggle (Fig. 5) comprising an upper toggle member 24 connected to a stationary portion of the frame of the machine and a lower toggle member 25 connected at 26 to a lever 27 adapted to impart reciprocatory movement to the pawl-carrying rod 28 of the feed mechanism. The details of the feed mechanism, except for the parts 22, 23, 24, 25 and 27 hereinbefore described, are substantially the same as those shown and described in my co-pending application above referred to, and for this reason a detailed description thereof is unnecessary. The arm 22 and link 23 are so proportioned and positioned relative to the toggle members 24, 25 that said toggle is in its straightened position when the shiftable actuator therefor, herein shown as the worm cage 21, is in its central position. Therefore, each time that the worm cage is shifted, the toggle 24, 25 will be shifted from flex position on one side of the center past its center or straightened position to a correspondingly flexed position on the opposite side of its center, thereby rocking the lever 27, which through the adjusting screw 29 actuates movement of the feed mechanism.

In my co-pending application before mentioned, I provide means controlled by the feed mechanism for automatically stopping relative traverse of the work and tool when the feeding movement has progressed to a predetermined point. In the present invention I provide such mechanism in improved form, herein comprising (Fig. 2) a sliding bolt 30 guided in a bearing 31 carried by the frame of the machine, and adapted to engage a latch portion 32 carried by a shiftable element, herein shown as the worm cage 21. The bolt 30 is constantly urged into locked relation with the latch 32 by a spring 33, but is held out of engagement with the same during the operation of the machine by a forked arm 34 engaging the bolt 30 and connected to a shaft 35 carrying the lip 36 adapted to be engaged by a catch 37 on a lever 38 fulcrumed at 39 to the frame of the machine and adapted to be rocked by the screw 40 of the feed-reducing lever 41, which corresponds to the feed-reducing lever 107 in my copending application. When the lever 41 has been sufficiently elevated to rock the lever 38 to release the lip 36 from the catch 37, the spring 33 will pull the bolt 30 forwardly into position to engage the latch 32. If the worm cage is rocked to its extreme left position, as shown in Fig. 2, the bolt 30 will not immediately stop the relative traverse of the work and tool by holding the worm cage in central position with both worms out of engagement with the worm gear 18, but will permit one more relative traverse of the work and tool so that the latch 32 is at the right (as viewed in Fig. 2) of the bolt 30, after which, at the next period of reversal, the latch 32 will catch against the bolt 30, thereby holding the worm cage in central position and stopping the machine with the work facing the operator in convenient position for gaging of the work and removal thereof from the work chuck. If it is desired to start the machine in operation again, the feed must be turned back an amount corresponding to the additional amount of stock which it is desired to remove, after which the hand lever on the shaft 35 may be depressed until the lip 36 engages the catch 37. This operation will cause the arm 34 to engage the pins 42 projecting from the bolt 30 and result in the removal of the bolt from behind the catch 32, thereby freeing the worm cage and permitting it to be shifted to the position shown in Fig. 2 by the operation of reverse mechanism hereinafter described.

In the preferred form of my invention shown in the drawings, I have provided a reverse mechanism which performs the same functions as that shown and described in my copending application, but which is somewhat simpler in operation and somewhat easier to adjust. Referring to Fig. 6 I have shown tappets 50 and 51 carried by the oscillatory support 8 and adapted alternately to strike against and rock a lever 52 fulcrumed at 53 and connected at 54 to a sliding element 55 carrying cams 56 and 57 adapted to rock levers 58 and 59 engaging respectively plungers 60 and 61 slidably carried in a bored portion of the projecting end 62 of the worm cage 21. The plungers 60 and 61 are urged apart by a spring 63 interposed between them. The top of the projecting end 62 of the worm cage 21 carries latch-engaging portions 64 and 65 adapted to be engaged by latches 66 and 67 fulcrumed on a stationary portion of the machine and connected to levers 68 and 69 urged outwardly by springs 70 and 71 so that the tendency of the latches 66 and 67 is to engage the latch-engaging portions 64 and 65. When the reverse mechanism is in the position shown in Fig. 6, the moving part to be reversed, herein typified by an oscillatory table 8, is moving from left to right as viewed in Fig. 6, and the tappet 50 has engaged the lever 52 and has moved the same a sufficient distance to shift the cam 56 to the right, thereby rocking the lever 58 and partially loading the spring 63 carried by the extension of the shifting element 62. When the tappet 50 has shifted the lever 52 still farther to the right, the cam 56 will rock the lever 58 still farther, thereby giving more compression to the spring 63, after which the pin 72 connected to the lever 52 will engage the face 73 of a latch-tripping slide 75, thereby shifting the same to the right until the screw 75 engages the bell crank 68, thereby disengaging the latch 66 and permitting the spring 63 to shift the shiftable element 62 to the right, thus reversing the driving connections while permitting the latch 67 to engage the latch-engaging portion 65 to hold the shiftable element firmly in its extreme right-hand position. The parts will remain in this position until the movement of the tappet 51 to the left engages the lever 52 and moves it to the left sufficiently to cause the reverse mechanism to function in the same manner previously described, but in the opposite direction.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. In a grinder having a work support, a tool support and traversing means for moving one of said supports relative to the other, said traversing means including a shiftable element; reverse means for said traversing means comprising in combination, tappet means carried by the moving support, lever means for engagement by said tappet means, cam means movable by said lever means, and operative connections above said cam means for transmitting power therefrom to shift said shiftable element.

2. In a grinder having a work support, a tool support and traversing means for moving one of said supports relative to the other, said traversing means including a shiftable element; reverse means for said traversing means comprising, in combination, tappet means carried by the moving support, lever means for engagement by said tappet means, rectilinearly slidable cam means movable by said lever means, and operative connections above said cam means for transmitting power therefrom to shift said shiftable element.

3. In a grinder having a work support, a tool support and traversing means for one of said supports; said traversing means including a shiftable element, reverse means comprising, in combination, lever means shiftable by said traversing means and operatively controlling energy-storing means to shift said shiftable element and latch means for restraining and releasing said energy-storing means, said latch means being alternately disengageable by said lever.

4. In a grinder having a work carrier and a tool carrier and means for traversing one of said carriers relative to the other, feed mechanism, driving means including a shiftable cage, a latch carried by said cage and a bolt controlled by said feed mechanism for engaging said latch and holding said cage in central position, thereby to discontinue relative traverse of the work carrier and tool carrier.

5. In a grinder having a work carrier and a tool carrier and means for traversing one of said carriers relative to the other, feed mechanism, driving means including pivoted means carrying oppositely effective driving elements and means controlled by said feed mechanism for engaging said pivoted means at a point adjacent that portion thereof having the greatest movement, and for stopping said pivoted means with said driving elements in inoperative position.

6. In a grinder, a work carrier, a tool carrier, traversing means for traversing one of said carriers relative to the other, and feed mechanism coördinately controlled with said traversing means and including a pawl and toggle mechanism for imparting movement to said pawl.

In testimony whereof, I have signed my name to this specification.

FREDERICK H. HALSTEAD.